(12) United States Patent
Shkunov et al.

(10) Patent No.: US 10,944,234 B2
(45) Date of Patent: Mar. 9, 2021

(54) OPTICAL FIBER FOR LIGHT AMPLIFICATION HAVING A CORE WITH LOW BEND LOSS AND END FEATURES WITH HIGH BEND LOSS AND RELATED METHOD

(71) Applicant: Raytheon Company, Waltham, MA (US)

(72) Inventors: Vladimir V. Shkunov, Florence, AZ (US); David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 35 days.

(21) Appl. No.: 16/206,651

(22) Filed: Nov. 30, 2018

(65) Prior Publication Data

US 2019/0109430 A1 Apr. 11, 2019

Related U.S. Application Data

(63) Continuation of application No. 15/437,418, filed on Feb. 20, 2017, now Pat. No. 10,177,521.

(51) Int. Cl.
*H01S 3/067* (2006.01)
*H01S 3/08* (2006.01)
(Continued)

(52) U.S. Cl.
CPC ...... *H01S 3/06729* (2013.01); *H01S 3/06704* (2013.01); *H01S 3/06708* (2013.01);
(Continued)

(58) Field of Classification Search
CPC ............ H01S 3/06729; H01S 3/06754; H01S 3/08045; H01S 3/06704; H01S 3/102; G02B 6/028
See application file for complete search history.

(56) References Cited

U.S. PATENT DOCUMENTS 6,229,939 B1 5/2001 Komine
6,570,702 B2 5/2003 Wilcox et al.
(Continued)

OTHER PUBLICATIONS

Khitrov et al., "Er-doped high aspect ratio core (HARC) rectangular fiber producing 5-mJ, 13-nsec pulses at 1572 nm", Lasers, Sources and Related Photonic Devices, OSA Technical Digest, Jan. 2012, 3 pages.

(Continued)

*Primary Examiner* — Yuanda Zhang

(57) ABSTRACT

An apparatus includes an optical fiber configured to transport an optical signal. A cross-section of the optical fiber has a longer slow-axis dimension and a shorter fast-axis dimension. The optical fiber includes a core configured to receive and amplify the optical signal, end features optically coupled to the core at opposite ends of the core, and a cladding surrounding the core and end features. The core has a height in the slow-axis dimension and a width in the fast-axis dimension. Each end feature has a height in the slow-axis dimension and a width in the fast-axis dimension. The core has a lower bend loss than the end features. The optical fiber is configured to confine optical power of a fundamental mode in the core and allow optical power of higher-order mode(s) to leak from the core into the end features. Each end feature's height is less than the core's width.

20 Claims, 5 Drawing Sheets

(51) Int. Cl.
  *G02B 6/028* (2006.01)
  *H01S 3/102* (2006.01)
(52) U.S. Cl.
  CPC ...... *H01S 3/06754* (2013.01); *H01S 3/08045* (2013.01); *G02B 6/028* (2013.01); *H01S 3/0672* (2013.01); *H01S 3/102* (2013.01)

(56) References Cited

U.S. PATENT DOCUMENTS

| | | | |
|---|---|---|---|
| 6,904,219 | B1 | 6/2005 | Fermann |
| 7,860,360 | B2 | 12/2010 | Rockwell et al. |
| 7,978,943 | B2 | 7/2011 | Rockwell et al. |
| 7,983,312 | B2 | 7/2011 | Shkunov et al. |
| 8,014,426 | B2 | 9/2011 | Shkunov et al. |
| 8,565,272 | B2 | 10/2013 | Shkunov et al. |
| 8,594,476 | B2 | 11/2013 | Shkunov et al. |
| 8,606,062 | B2 | 12/2013 | Shkunov et al. |
| 8,643,942 | B2 | 2/2014 | Strohkendl et al. |
| 8,705,918 | B2 | 4/2014 | Shkunov et al. |
| 9,322,988 | B2 | 4/2016 | Digiovanni et al. |
| 2007/0104431 | A1 | 5/2007 | Di Teodoro et al. |
| 2010/0189401 | A1* | 7/2010 | Shkunov ............ H01S 3/06708 385/129 |
| 2013/0142480 | A1 | 6/2013 | McVey et al. |
| 2015/0110452 | A1 | 4/2015 | Digiovanni et al. |

OTHER PUBLICATIONS

Dong et al., "Leakage channel optical fibers with large effective area", Journal of the Optical Society of America B, vol. 24, No. 8, Aug. 2007, pp. 1689-1697.

Marcuse, "Curvature loss formula for optical fibers", Journal of the Optical Society of America, vol. 66, No. 3, Mar. 1976, pp. 216-220.

Desmoulins et al., "High-gain Er-doped fiber amplifier generating eye-safe MW peak-power, mJ-energy pulses", Optics Express, vol. 16, No. 4, Feb. 2008, pp. 2431-2437.

Rockwell et al., "Semi-guiding high-aspect-ratio core (SHARC) fiber providing single-mode operation and an ultra-large core area in a compact coilable package", Optics Express, vol. 19, No. 15, Jul. 2011, pp. 14746-14762.

Marciante et al., "Semi-guiding high-aspect-ratio core (SHARC) fiber amplifiers with ultra-large core area for single-node kW operation in a compact coilable package", Optics Express, vol. 20, No. 18, Aug. 2012, pp. 20238-20254.

Drachenberg, et al., "First multi-watt ribbon fiber oscillator in a high order mode", Optics Express, vol. 21, No. 15, Jul. 2013, pp. 10809-18096.

Koplow et al., "Single-mode operation of a coiled multimode fiber amplifier", Optics Letters, vol. 25, No. 7, Apr. 2000, pp. 442-444.

Marciante et al., "Near-diffraction-limited operation of step-index large-mode-area fiber lasers via gain filtering", Optics Letters, vol. 35, No. 11, Jun. 2010, pp. 1828-1830.

Khitrov et al., "Er-doped high-aspect-ratio core rectangular fiber producing 5 mJ, 13 ns pulses at 1572 nm", Optics Letters, vol. 37, No. 19, Oct. 2012, pp. 3963-3965.

International Search Report and Written Opinion of the International Searching Authority for International Application No. PCT/US2017/055517 dated Feb. 20, 2018, 15 pages.

Yong et al., "Numerical Investigation of Single-Mode Operation Flat Fiber and Dispersion," MRS Singapore—ICMAT Symposia Proceedings, 8th International Conference on Materials for Advanced Technologies, Procedia Engineering, vol. 140, 2016, pp. 95-98.

Office Action dated Jul. 21, 2020 in connection with counterpart Japanese Patent Application No. 2019-543839, 4 pages.

* cited by examiner

OPTICAL FIBER FOR LIGHT AMPLIFICATION HAVING A CORE WITH LOW BEND LOSS AND END FEATURES WITH HIGH BEND LOSS AND RELATED METHOD

CROSS-REFERENCE TO RELATED APPLICATION AND PRIORITY CLAIM

This application is a continuation of U.S. patent application Ser. No. 15/437,418 filed on Feb. 20, 2017, which is hereby incorporated by reference in its entirety.

TECHNICAL FIELD

This disclosure is generally directed to optical fibers used for light amplification. More specifically, this disclosure is directed to an optical fiber for light amplification having a core with low bend loss and end features with high bend loss and a related method.

BACKGROUND

Laser systems that output high-quality beams can be used in a number of applications. For example, low-noise, high-power amplifiers could be used in telecommunication systems to support the transport of information over very long distances. Some laser systems use fiber amplifiers to amplify light, meaning the light is amplified within optical fibers that are transporting the light. A fiber amplifier generally includes a core and a cladding around the core, where light travels through the core and is amplified by active lasing ions within the core.

There are a number of fiber amplifiers that have been developed over the years. One goal of fiber amplifier designs has been to increase a core's cross-sectional area without compromising an output beam's quality. A larger core area increases the energy-storage capacity of the fiber due to the larger volume of doped material in the core. This can be particularly beneficial for pulsed laser systems or other high-energy laser systems since it reduces optical intensity in the core and increases thresholds for deteriorating non-linear effects.

Some fiber amplifiers have included large circular cores, but scaling up the size of a circular core typically decreases an output beam's quality. As a result, fiber amplifiers with other core shapes have been developed, such as rectangular cores. However, fiber amplifiers with rectangular cores are highly multi-mode in their larger dimension, which can lead to difficulties in maintaining high output beam qualities.

SUMMARY

This disclosure provides an optical fiber for light amplification having a core with low bend loss and end features with high bend loss and a related method.

In a first embodiment, an apparatus includes an optical fiber configured to transport an optical signal. A cross-section of the optical fiber has a longer slow-axis dimension and a shorter fast-axis dimension. The optical fiber includes a core configured to receive and amplify the optical signal, where the core has a height in the slow-axis dimension and a width in the fast-axis dimension. The optical fiber also includes end features optically coupled to the core at opposite ends of the core, where each end feature has a height in the slow-axis dimension and a width in the fast-axis dimension. The core has a lower bend loss than the end features. The optical fiber further includes a cladding surrounding the core and the end features. The optical fiber is configured to confine optical power of a fundamental mode in the core and to allow optical power of one or more higher-order modes to leak from the core into the end features. The height of each end feature in the slow-axis dimension is less than the width of the core in the fast-axis dimension.

In a second embodiment, a method includes injecting an optical signal into an optical fiber, where a cross-section of the optical fiber has a longer slow-axis dimension and a shorter fast-axis dimension. The method also includes confining optical power of a fundamental mode in a core of the optical fiber. The core is configured to receive and amplify the optical signal, and the core has a height in the slow-axis dimension and a width in the fast-axis dimension. The method further includes allowing optical power of one or more higher-order modes to leak from the core into end features, where the end features are optically coupled to the core at opposite ends of the core. Each end feature has a height in the slow-axis dimension and a width in the fast-axis dimension, and the core has a lower bend loss than the end features. The height of each end feature in the slow-axis dimension is less than the width of the core in the fast-axis dimension.

In a third embodiment, a method includes obtaining an optical fiber. A cross-section of the optical fiber has a longer slow-axis dimension and a shorter fast-axis dimension. The optical fiber includes a core configured to receive and amplify an optical signal, where the core has a height in the slow-axis dimension and a width in the fast-axis dimension. The optical fiber also includes end features optically coupled to the core at opposite ends of the core, where each end feature has a height in the slow-axis dimension and a width in the fast-axis dimension. The core has a lower bend loss than the end features. The optical fiber further includes a cladding surrounding the core and the end features. The method also includes selecting a bend radius of the optical fiber in order to strip optical power, including optical power of one or more higher-order modes, from the end features while allowing the optical fiber to guide optical power of a fundamental mode in the core. The height of each end feature in the slow-axis dimension is less than the width of the core in the fast-axis dimension.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
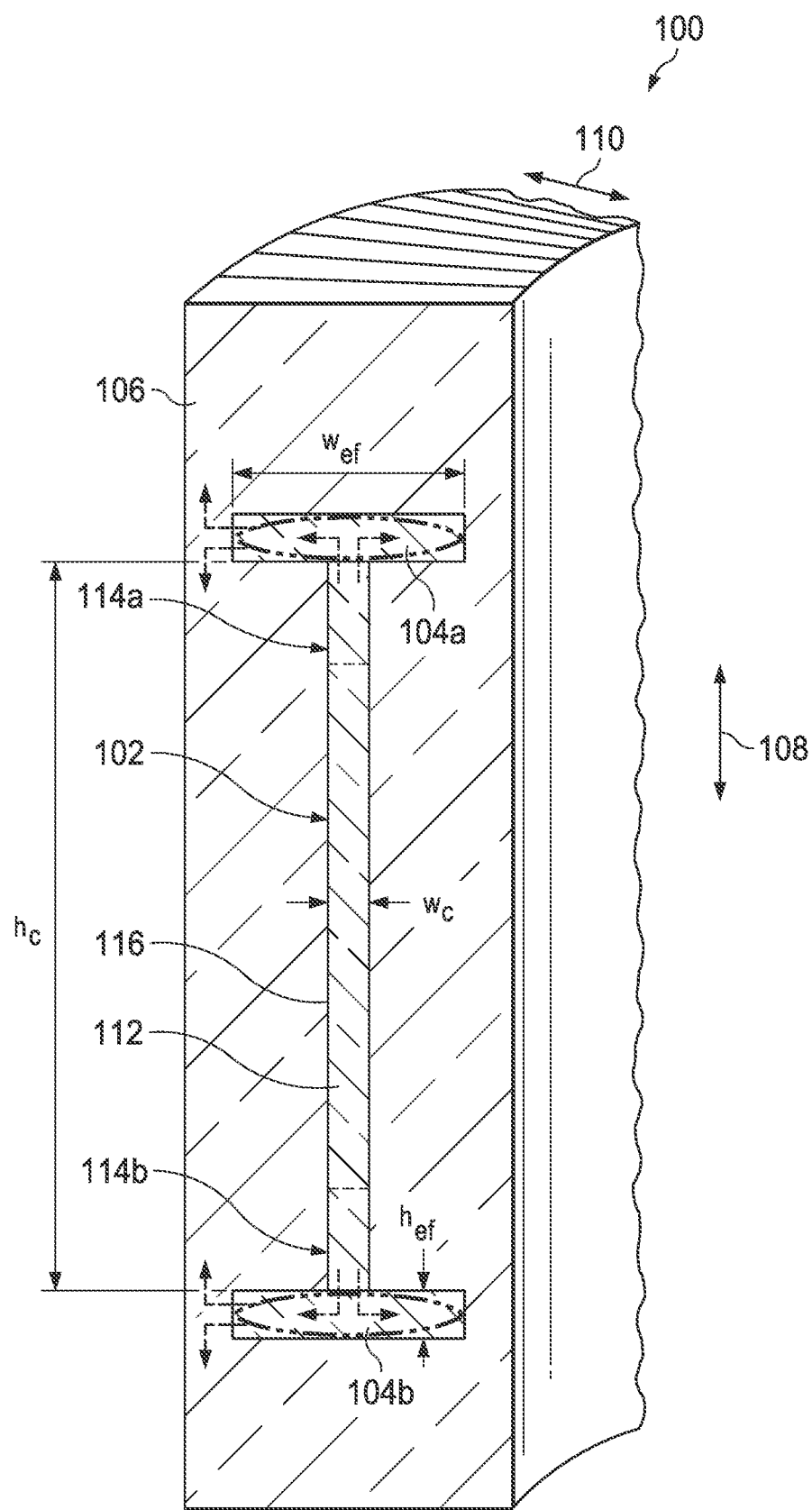
FIG. 1 illustrates a cross-section of a short, curved length of an example optical fiber having a core with lower bend loss and end features with higher bend loss according to this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, various attempts have been made to increase the cross-sectional area of a core in an optical fiber, such as by increasing the size of a circular core. However, increasing the size of a circular core in an optical fiber leads to various problems. For example, the larger core diameter for a constant core numerical aperture (NA) converts a single-mode fiber into a multimode waveguide structure, which results in poor output beam quality. Also, mode mixing makes it very difficult to provide single-transverse-mode propagation since a typical long fiber often needs to be coiled for size, weight, and packaging (SWaP) reasons. An alternative approach involves keeping a relatively small core Normalized Frequency Parameter (also called a V-number) by reducing the core NA simultaneously with an increase in the core's diameter. This helps to reduce the number of guided modes of the core, but the minimum tolerable bend diameter that can provide single-mode output becomes larger and larger for low-NA core fibers, which complicates the packaging.

Some known low-NA structures are based on photonic crystal fiber (PCF) technology. These fibers need to be straight since even minor bends can induce strong bend-induced leakage from the low-NA core. For this reason, a PCF fiber with a very large core area (typically called a rod-like fiber) is usually packaged into a much larger cylindrical glass-rod cladding. The large cladding diameter mechanically constrains bending and often leads to the use of short fiber pieces, which again can complicate achieving low-SWaP packaging. The thick glass cladding also makes short rod-like fibers sensitive to thermal loads, and denser thermal loads per unit length lead to thermal lensing due to relatively high temperature gradients arising from poor thermal conduction through the thick cladding.

Problems with optical fibers having enlarged circular cores have led to the development of optical fibers with other core shapes, such as rectangular cores with high aspect ratios. One example of this is the semi-guiding high-aspect-ratio-core (SHARC) fiber architecture developed by RAYTHEON COMPANY. A SHARC optical fiber includes a rectangular core having a very large aspect ratio, meaning the longer dimension of the core is much larger than the smaller dimension of the core. The rectangular core includes a central region doped with active lasing ions, and the central region is located between passive material inserts. Additional details of an example SHARC fiber architecture are provided in U.S. Pat. No. 7,983,312 (which is hereby incorporated by reference in its entirety).

Among other uses, SHARC optical fibers are attractive for designing low-noise, high-power fiber amplifiers for telecommunication systems because they help to reduce Kerr nonlinearities and thermal contributions to phase noise in the optical fibers. For continuous wave (CW) high-energy laser (HEL) fiber systems, SHARC optical fibers can help in power scaling. Namely, high-aspect-ratio cores can allow an increase in the power output per combinable fiber. The overall system's complexity can therefore be reduced by using a lower number of combinable channels.

In designs such as the SHARC architecture, the longer dimension of the core is said to extend along the "slow-axis" of the core, while the shorter dimension of the core is said to extend along the "fast-axis" of the core. The high aspect ratio of the core helps to facilitate single-mode propagation of light in at least one direction, primarily along the narrower fast-axis. Single-mode propagation through such a core can be obtained, since only one mode or just a few modes are guided in the fast-axis direction. The core is still highly multimode in the slow-axis direction where the core is very wide, so many slow-axis modes can be trapped in the core.

Because a fiber such as a SHARC fiber has a highly multimode core, a mode-selection mechanism is used to obtain a high-quality optical beam out of the fiber. The mode-selection mechanism discriminates in favor of the fundamental transverse mode of the core and against the other higher-order modes. "Gain filtering" is one of several mode-selection mechanisms that could be used. Gain filtering facilitates a stronger gain for a fundamental mode of the core. In a SHARC fiber, for example, a concentration of an active dopant near the central axis of the core in the slow-axis direction enables gain filtering. Providing a stimulated-emission gain near a flattened core's center may yield the highest spatial overlap for the fundamental mode of the core with the gain region. This facilitates the highest gain for that specific mode, which carries diffraction-limited quality light along the fiber so that it dominates at the fiber's output.

"Loss filtering" can also or alternatively be used for mode selection. Loss filtering facilitates stronger leakage of higher-order modes into the surrounding cladding while also providing a zero or low leakage rate for the fundamental mode. As a particular simplified example, a cladding having the same refractive index as the core could be situated within mode-index-matching regions adjacent to the slow-axis edges of the core.

Note, however, that the interface between a planar guiding core and an outside "free-space" propagation medium provides reflection at the core's edges, even when the index of the core material is the same as that of the cladding material and no index step exists at the core's edges. The reflecting border at the edges appears due to different spatial dispersion characteristics of the propagation of light through the core and through the cladding beyond the core's edges. While reflection by the edges persists, there is an optimal index offset between the index-matching region and the core that provides a minimal reflection back to the core and a maximum leakage rate out of the core.

Previously, the optimal index difference was found for a simple special case of "infinite size" of the index-matching regions. Near this optimum, all slow-axis modes of the core experience maximum propagation loss induced by leaking power into the surrounding cladding. Also, the leakage rate for a slow-axis mode of order m grows rapidly with the order, and the loss rate increases approximately proportionally with $m^2$. The strong mode-order dependence results here in the "loss filtering effect." Namely, loss filtering helps to reduce the power content carried by higher-order modes in the core. The fundamental mode of the core experiences the least leakage loss, significantly lower than for any other mode. When a fiber's length is selected to make the total leakage for the fundamental mode over the entire fiber length low and the leakage for other modes strong, good beam quality can be readily achieved. In such conditions, the fundamental mode is amplified efficiently to accumulate stored inversion energy and to dominate at the fiber's output, while higher-order modes fail to compete for store energy.

The cross-sectional dimensions for any real fiber are limited, however, and an "infinite size" for the index-matching regions is just an approximation. The space serving as a reservoir for sinking the optical power of higher-order modes is actually of finite volume. With that in mind, a SHARC or other fiber architecture can use "end features" at the ends of the core. In this approach, index-matching regions are specified as optically-guiding regions that are adjacent to the core's slow-axis edges and that are separated from the main lower-index cladding of the fiber by total internal reflection (TIR) walls. Light of the higher-order modes can therefore leak out of the core into the end features, and the end features accumulate the leaked power. Ideally, just the fundamental mode remains persistently inside the fiber's core, while higher-order modes mostly leak out into the end features.

Unfortunately, light that leaks from the core into the end features is trapped by the guiding TIR walls of the end features as the light propagates down the fiber. If the total light power in the end features becomes strong, the capacity of the end features to carry light can be exhausted, which results in a condition called "overfill." Light from the overfilled end features can travel back and forth between the core and the end features as the light propagates down the fiber, which is sometimes referred to as "slosh-back." The light that returns to the core from the end features can populate transverse modes of different orders, resulting in modal contamination of the fundamental mode. Under these conditions, the output beam quality can be degraded again.

While an absorbing dopant added to the end features can mitigate this problem, it may be very difficult to find doping material for end features that can serve as a suitable absorber in certain systems, such as in silica glass systems of practical importance like Ytterbium (Yb) doped or Erbium (Er) doped fibers. The dopant would need to absorb enough energy at the signal wavelength to efficiently attenuate the leaked light, but the end features should be highly transparent to the pump light since the pump and signal share the same waveguides. Otherwise, the lasing efficiency of the system can be compromised, because the pump power would be partially wasted due to dissipative heating of the absorber in the end features, rather than pumping up the laser medium inversion. Unfortunately, the spectral separation between the pump and signal bands may not be very large, such as for Yb and Er fibers when the most efficient "in-band" resonant pumping scheme is applied. Potentially available absorbing ions, like Samarium (Sm) or Thulium (Tm), that can absorb the signal light, also impose noticeable losses at the pump wavelength. Moreover, the power absorbed by the end features heats the core near the core's edges. This can change the refractive index distribution along the slow-axis of the core and distort the core's modes. This can also change the power balance between the core and the end features by pulling extra light from the core into the heated end features, where the index is increased.

This disclosure provides optical fibers having cores with lower bend loss and end features with higher bend loss. The core of an optical fiber can be elongated in a first direction and may have a high aspect ratio. A small core dimension in the fast-axis direction makes the core resistant to bend loss if the fiber is bent in the fast-axis direction. The end features, which are located at the slow-axis edges of the core, are designed to experience strong bend loss. In some embodiments, the end features are elongated in a second direction that is transverse to the first direction. In particular embodiments, the core and the end features all have rectangular shapes, although other shapes for the core and the end features could also be used. The core shape allows only a single fundamental mode or perhaps just a few modes to be guided in the fast-axis direction. Undesired higher-order slow-axis modes leak into the end features. If the optical fiber is properly bent, the elongated nature of the end features allows the optical power accumulated by the end features to leak out into the cladding of the optical fiber, away from the core. In this manner, bend loss in the end features replaces absorption loss, along with all of its associated detrimental thermal effects.

In this proposed design approach, undesirable higher-order modes of light can travel out of the core into the end features and then radiate directly out into the surrounding cladding of an optical fiber. The radiative power leakage can be induced by bending the fiber, such as by coiling the fiber (which is often how an optical fiber is packaged in a typical system). This approach therefore actually uses the bending of the fiber as a way to promote leakage of optical power from the end features. This approach also allows the shape of the end features and the bend radius of the optical fiber to be selected so that the bend-induced leakage is strong for any transverse modes of the end features but is negligibly low for the fundamental mode in the fiber core.

FIG. 1 illustrates a cross-section of a short, curved length of an example optical fiber 100 having a core 102 with lower bend loss and end features 104a-104b with higher bend loss according to this disclosure. The core 102 and the end features 104a-104b here combine to create an I-shaped structure in this example. The optical fiber 100 is configured to transport and amplify light through the core 102 in a propagation direction perpendicular to the plane of illustration in FIG. 1. The end features 104a-104b are configured to receive light of higher-order modes from the core 102, and to allow the optical power of the higher-order modes to leak out of the end features 104a-104b into a surrounding cladding 106.

The core 102 denotes an elongated core region of the optical fiber 100. The core 102 is elongated so that the core 102 is substantially wider in a slow-axis direction 108 and substantially thinner in a fast-axis direction 110. In some embodiments, the aspect ratio of the core 102 (slow-axis dimension to fast-axis dimension) is 10:1, 20:1, 40:1, or even more. While shown as being rectangular in FIG. 1, the core 102 could have other suitable elongated shapes.

Each of the end features 104a-104b denotes an elongated region at an end of the core 102. Each of the end features 104a-104b is elongated so that the end feature is substantially wider in the fast-axis direction 110 and substantially thinner in the slow-axis direction 108. Because of this, the core 102 is elongated in one direction (the slow-axis direction 108) and the end features 104a-104b are elongated in a transverse direction (the fast-axis direction 110). While shown as being rectangular in FIG. 1, each of the end features 104a-104b could have other suitable elongated shapes, such as an ellipse, half-moon, or other shapes that enable stronger bend loss as compared to the bend loss in the core 102. The dashed ellipses in FIG. 1 illustrate one other example shape for the end features 104a-104b.

The core 102 could be formed from any suitable material(s) and in any suitable manner. For example, the core 102 could be formed from silica glass or other material(s) and be doped with suitable rare-earth ions or other active lasing ions. Example lasing ions include Ytterbium (Yb), Neodymium (Nd), Erbium (Er), Thulium (Tm), or Holmium (Ho). The core 102 here includes a central portion 112 and outer portions 114a-114b on opposite sides of the central portion 112. The central portion 112 denotes the active portion of the core 102 that provides amplification. The outer portions 114a-114b denote passive portions of the core 102, where there is no amplification. The outer portions 114a-114b have a refractive index such that there are no reflections at the interfaces between the central portion 112 and the outer portions 114a-114b. This allows an amplified signal to "overfill" the active central portion 112 of the core 102 in the slow-axis direction 108. The refractive index of the outer portions 114a-114b can be controlled, such as by specifying the appropriate dopant concentrations in those areas.

The end features 104a-104b could also be formed from any suitable material(s) and in any suitable manner. For instance, the end features 104a-104b could be formed from silica glass or other material(s). The end features 104a-104b are not doped with active lasing ions, since the end features 104a-104b need not provide any amplification of the undesired higher-order modes. In addition, the cladding 106 could be formed from any suitable material(s) and in any suitable manner. The cladding 106 generally has an index of refraction that is smaller than the index of refraction of the core 102 and the end features 104a-104b.

The core 102 forms a waveguide, and the end features 104a-104b form additional waveguides that extend from and are oriented perpendicular to the plane of the core 102. As discussed in more detail below, this configuration promotes the leakage of light collected by the end features 104a-104b into the external cladding 106 away from the core 102. This denotes a radiative leakage loss (as opposed to a dissipative loss) that can be exploited to avoid the accumulation of optical power in the end features 104a-104b, while also avoiding the deteriorating effects of power dissipation and heat produced by conventional absorbing end features.

The loss provided by the end features 104a-104b is used to dispose of higher-order core-mode light, which helps to eliminate the higher-order modes in the core 102 in favor of the fundamental mode. Leakage from the end features 104a-104b into the cladding 106 also offers protection against the higher-order mode light reentering the core 102 from the end features 104a-104b. The external cladding 106 is much bigger in area compared to the end features 104a-104b, so this secondary leakage from the end features 104a-104b expands in the external cladding 106 to produce a low optical intensity spread over the fiber cross-section, where it cannot significantly impact the beam quality carried by the compact core mode.

Because the end features 104a-104b extend along the fast-axis direction 110, the end features 104a-104b are susceptible to leakage losses into the external cladding 106 through the left edge in the horizontal direction of FIG. 1 (assuming the bend axis of the coiled fiber 100 is at the right side of FIG. 1). This is shown by the dashed arrows in FIG. 1. However, the core 102 remains substantially leak-free in the fast-axis direction 110 through wide core-cladding interface surfaces 116. As discussed below, a few design features pertaining to (i) refractive index values and waveguide dimensions, (ii) the shape and aspect ratio of the end feature waveguides, and (iii) the fast-axis curvature of a coiled fiber can be selected to help optimize the operation of the optical fiber 100.

Although FIG. 1 illustrates one example of an optical fiber 100 having a core 102 with lower bend loss and end features 104a-104b with higher bend loss, various changes may be made to FIG. 1. For example, in any specific implementation, the sizes, shapes, relative dimensions, aspect ratios, and refractive-index values of either or both of the core 102 and end features 104a-104b of the optical fiber 100 could vary as needed or desired. Also, the core 102 and the optical fiber 100 could include a number of additional features that are omitted from FIG. 1 for simplicity, such as the features described in U.S. Pat. No. 7,983,312 (incorporated by reference above).

Figure 2:
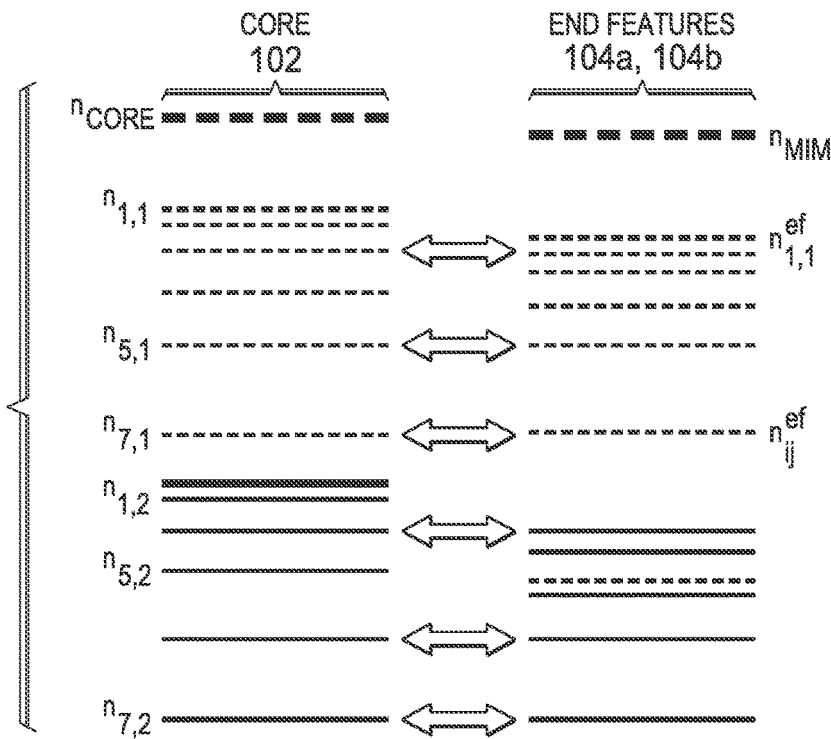
FIG. 2 illustrates example effective-index values for different modes of light propagating through an optical fiber having a core with lower bend loss and end features with higher bend loss according to this disclosure.

FIG. 2 illustrates example effective-index values for different modes of light propagating through an optical fiber having a core with lower bend loss and end features with higher bend loss according to this disclosure. Note that while described with respect to the optical fiber 100 of FIG. 1, other optical fibers could be used, such as optical fibers having other core or end feature shapes, dimensions, aspect ratios, or refractive-index values.

In some embodiments of the optical fiber 100, the refractive index of the material forming the end features 104a-104b can be "reasonably closely" matched to the refractive index of the material forming the core 102. More specifically, the refractive index of the end features 104a-104b can be selected such that the effective refractive index of one or more modes of the end features 104a-104b can reasonably closely match the effective refractive index of one or more higher-order modes of the core 102. Because of this property, the material forming the end features 104a-104b is denoted a mode-index matching (MIM) material. This MIM condition facilitates mode clean-up via loss filtering as described above. An optimal index matching allows the higher-order slow-axis modes to leak into the end features 104a-104b at a much higher rate than the fundamental mode of the core 102.

The degree of index matching can be driven by the design of the end features 104a-104b and is geometry-specific. The following discloses a condition for index matching optimization in the optical fiber 100. One goal of this process is to find a proper index offset between the core 102 and the end features 104a-104b for the best mode discrimination. An optimal offset is driven by the structure of the transverse modes of the optical fiber geometry, which is defined by the shapes and dimensions of the waveguides formed by the core 102 and the end features 104a-104b.

In the optical fiber 100 or similar fibers, the core 102 and the end features 104a-104b represent three coupled waveguides. The core 102 denotes a planar waveguide, and the end features 104a-104b also denote (smaller) planar waveguides. Each of these waveguides is highly multimode, and all three waveguides (if treated separately in isolation from one another) have separate discrete sets of two-dimensional transverse modes. Each transverse mode is also characterized by an effective mode refractive index.

The effective indexes for the modes of any waveguide lie below a value of refractive index of the material forming that waveguide. For each waveguide, there is a fundamental mode that has a highest mode index and that usually has a single-lobed profile within the waveguide. The effective indexes for families of higher-order modes are positioned below the fundamental mode index. An example of this is shown in FIG. 2, where the refractive indexes of the material(s) forming the core 102 and the end features 104a-104b are denoted $n_{core}$ and $n_{MIM}$, respectively. The effective index for the fundamental mode in the core 102 is denoted $n_{1,1}$, and the effective indexes for the higher-order modes in the core 102 are denoted $n_{i,j}$ (where at least one of i and j is greater than one). The effective indexes for transverse modes in the end features 104a-104b differ, in general, from the core-mode indexes and are denoted $n^{ef}_{1,1}$ and $n^{ef}_{i,j}$ in FIG. 2.

Both the maximum effective index and the spacing between the mode indexes depend on a multimode waveguide's cross-sectional dimensions and its shape (or aspect ratio), as well as on the material index inside the waveguide. The maximum effective index and the spacing between the mode indexes can also be impacted somewhat by material indexes of surrounding materials. The transverse modes of the core 102 and of the end features 104a-104b are based on different guide geometries, since the core 102 and the end features 104a-104b have different sizes (and possibly shapes). Therefore, it is clear that the "spectra" of the effective indexes for the mode families are also different for the core 102 and for the end features 104a-104b.

The core 102 and the end features 104a-104b are in immediate contact at the edge interfaces of the core 102, and the contacted waveguides are optically coupled. The transverse mode is normally localized within its waveguide, but it naturally extends somewhat beyond that waveguide near its borders. Thus, the modes of two adjacent waveguides in the optical fiber 100 can spatially overlap, resulting in an interaction that leads to mixing those modes upon propagation. The resulting mixed modes usually become delocalized to share the volumes of both waveguides. Moreover, the interacting modes can distort each other so that each of the mixed modes is not just a linear combination of the originating modes. As the degree of spatial overlap increases, the interactions become stronger, and more distortions are induced into mode patterns.

The interaction strength between the propagating modes is enhanced by resonance conditions. Resonances arise in coupled optical waveguides if the modes have equal or nearly equal effective indexes. Such modes synchronously propagate down the length of the optical fiber, having the same phase velocity and being in the same relative phase over almost the entire fiber length. These conditions maximize the optical coupling and the leakage of optical power from one waveguide to another waveguide for the mixed modes.

The population for the index-level families becomes dense when all waveguides are highly multimode, which is the case in the optical fiber 100. As a result, apart from the discrete character of the mode patterns, accidental resonances can become quite common. Ideally, any resonances involving the fundamental mode of the core 102 are avoided, which helps to maintain the fundamental mode in pristine condition. In the absence of interactions with the modes of the end features 104a-104b, the fundamental mode of the core 102 can avoid distortions and maintain good beam quality. Also, and as a consequence, the fundamental mode of the core 102 experiences minimal loss propagating compactly inside the core 102 and reduces or eliminates spills into the end features 104a-104b.

On the other hand, it is preferred that the higher-order core modes are optically coupled into the end features 104a-104b. Those modes have a lower effective index than the index $n_{1,1}$ of the fundamental mode. Being resonantly coupled to modes of the end features 104a-104b, the resonant modes form mixed modes and become delocalized, with a significant portion of the mixed-mode power residing within the waveguides formed by the end features 104a-104b. Under these conditions, adding a leakage loss to the end features 104a-104b helps to discriminate against those higher-order core modes relative to the fundamental core mode, and good beam quality is obtained by disposing of unwanted higher-order modes in the end features 104a-104b. In addition, spatial overlap of the delocalized modes with the actively doped core region is reduced, so gain filtering becomes more effective.

The objective of avoiding resonances for the fundamental mode while facilitating resonances for the higher-order modes can be well met if the effective index $n^{ef}_{1,1}$ of the fundamental mode in the end features 104a-104b is positioned below the effective index $n_{1,1}$ of the fundamental mode in the core 102. This relative positioning of the mode indexes provides suitable index matching between the core 102 and the end features 104a-104b for the optical fiber 100. An example of this disposition is shown in FIG. 2, where the index $n^{ef}_{1,1}$ of the end features' fundamental mode shown on the right is pushed somewhat below the highest core mode index $n_{1,1}$ shown on the left.

A target value for the index offset between $n^{ef}_{1,1}$ and $n_{1,1}$ should be large enough to cancel any resonances for the fundamental core mode. Similar to energy levels in quantum systems, every "index level" for waveguides is washed out by having a finite width $\delta_n$. Hence, the index offset $n_{1,1}-n^{ef}_{1,1}$ could exceed the width $\delta_n$ by at least a factor of two to three. An analogy with the energy levels of atomic systems can be illustrative here. The characteristic decay time for excited states due to fluorescence or an interaction with the environment defines an effective spectral width for the atomic levels. Similarly, the width $\delta_n$ of the mode-index levels is controlled by a length $\delta_z$ of unperturbed propagation on the corresponding mode down the fiber, where $\delta_n \approx \lambda/\delta_z$. For an optically isolated waveguide, the length $\delta_z$ can be defined by two characteristics, which are analogous to homogeneous and inhomogeneous broadening in spectroscopy terms. One characteristic is the length at which the mode power drops due to material absorption or scattering. Another characteristic is the length over which an envelope phase for this mode is conserved. Variations of the envelope phase along the z-axis (along the length of the optical fiber) can be induced by imperfections of the fiber draw, which result in slowly-varying waveguide characteristics along the fiber length. These are induced by variations of refractive index of the waveguide material or by variations of the waveguide cross-sectional shape and dimensions. The width $\delta_n$ may not be pre-determined from general analysis, since it is often a function of the fiber-draw quality, and better fiber quality results in narrower index-level separations.

More generally, the realistic index offset between the fundamental modes can be defined by the tolerances of fiber manufacturing, mostly by the tolerance for the relative material refractive index control for the core 102 and the end features 104a-104b. Even if one knows an optimal theoretical offset, the offset can be considered only as a target value, and index uncertainty can be defined empirically. One example approach could be that the offset should exceed the mode-index control tolerance by a factor of two.

There are several techniques to control the relative positions of the effective indexes for the two fundamental modes, one for the core 102 and another for the end features 104a-104b. Any one technique or a combination of techniques could be used with the optical fiber 100.

The dimensions of the core 102 (width $w_c$ and height $h_c$ as shown in FIG. 1) are typically driven by the intended application of the optical fiber 100, often by the maximum light power that can be tolerated by the core 102 in a specific application. As a result, those parameters typically cannot, or should not, be varied for index-matching purposes. The core index $n_{core}$ is also often pre-determined, such as by a glass composition or other core material that optimizes lasing efficiency. For this reason, a design could be developed under the assumption that the properties of the core 102 are given and fixed. The pre-determined waveguide cross-section of the core 102 fixes the relative offsets for the "ladder" of indexes corresponding to the families of transverse modes with respect to the material index $n_{core}$. Hence, the structure of the mode-index levels in the core 102 (such as those shown on the left in FIG. 2) becomes fixed, and one or more characteristics of the end features 104a-104b can be varied for index matching purposes.

Several approaches can be used to vary one or more characteristics of the end features 104a-104b. One approach is to pre-define the shape and dimensions of the end features 104a-104b. Using this approach, the relative positions of all mode indexes for the end features 104a-104b (such as those shown on the right in FIG. 2) become "frozen" relative to the material index $n_{MIM}$. Changing the index of the end feature material itself will change the indexes for all modes by approximately the same amount. As a result, the entire "ladder" of the end feature modes synchronously translates up or down as a whole with the material index $n_{MIM}$. Hence, a straightforward way of properly positioning the effective index matching would be to vary the material refractive index of the end features 104a-104b. For example, if the refractive index $n_{MIM}$ drops by an amount $\Delta n$, the indexes $n^{ef}_{i,j}$ for the transverse-mode "ladder" for the end features 104a-104b translate down by the same amount $\Delta n$. Conversely, if allowed to change the core material index $n_{core}$ by $\Delta n$, the indexes for all transverse modes of the core 102 are translated up or down by the same amount $\Delta n$. Thus, offsetting the index of the end feature material can be used to set its fundamental mode effective index as desired to prevent a direct resonance between those two modes.

Another approach involves recognizing that the material indexes $n_{core}$ and $n_{MIM}$ can be pre-determined, such as by glass-chemistry constraints. The design space is then available to systematically vary the shape and dimensions of the end features 104a-104b. Generally speaking, making a waveguide thinner pushes the indexes of the transverse modes further down below the material index. Because of this, making the end features 104a-104b smaller in size than the core 102 helps to avoid fundamental mode resonances, even when material indexes of the core 102 and the end features 104a-104b are equal or nearly equal.

Consider the example of rectangular end features 104a-104b as shown in FIG. 1. The set of transverse modes for a rectangular, multimode, high-aspect-ratio waveguide can be split into quite distinct families. Two discrete parameters can be used for organizing the core modes $M_{s,f}$, where the numeric index s denotes the slow-axis direction 108 and the numeric index f denotes the fast-axis direction 110. The effective indexes $n_{s,f}$ for all guided transverse modes lie below the waveguide material refractive index but above the cladding refractive index. The index $n_{1,1}$ of the fundamental mode $M_{1,1}$ is at the top, while higher-order modes reside below it (so $n_{1,1} > n_{s,f}$ for s>1 and f>1) and systematically step further down as s or f increases. Since the height $h_c$ greatly exceeds the width $w_c$ for the core 102 in FIG. 1, the mode index drops differ considerably when stepping from s to s+1 or from f to f+1. This happens because the amplitude of the ladder steps downward to lower effective-index values decreases as the square of the respective guide dimension. As a result, different slow-axis mode indexes of the same fast-axis order f are located very compactly in "refractive index space," being almost degenerate. On the other hand, even a single-step increase of the numeric index f to f+1 results in a significant effective index step down.

This is illustrated in FIG. 2, which shows two families for both the core 102 and the end features 104a-104b. The family of the lowest-order fast-axis mode $n_{s,1}$ is shown using one line pattern, and the family for the next fast-axis order $n_{s,2}$ is shown using a different line pattern. Each family starts with the lowest-order slow-axis mode and spreads down with an increasing slow-axis order at progressively increased steps. For large-size waveguides, the families with different fast-axis numeric orders can overlap, creating a cluster of index levels looking almost irregular.

When the thickness of each rectangular waveguide formed by the end features 104a-104b is smaller than the core's thickness (meaning $h_{ef} < w_c$ in FIG. 1), the effective index of the fundamental mode of the end features' waveguides drops down deeper with respect to the material index than for the core's fundamental mode. In other words, $(n_{MIM} - n^{ef}_{1,1}) > (n_{core} - n_{1,1})$. As a result, making narrower planar waveguides for the end features 104a-104b facilitates elimination of the core fundamental mode resonances when $n_{MIM} \approx n_{core}$.

Note that the approaches discussed above can be used even if the end features 104a-104b have a cross-sectional shape that is not rectangular, such as for elliptical, half-moon, or other shapes. Both approaches of tuning the relative positions for the fundamental mode indexes (material index variations and waveguide size and shape changes) are effective for placing mode indexes for multimode end feature waveguides safely below the core fundamental mode index.

Although FIG. 2 illustrates examples of effective-index values for different modes of light propagating through an optical fiber having a core with lower bend loss and end features with higher bend loss, various changes may be made to FIG. 2. For example, the effective-index values and the shifts in the effective-index values are for illustration only, and other effective-index values and shifts (such as due to the aspect ratio) could be used in an optical fiber.

Figure 3:
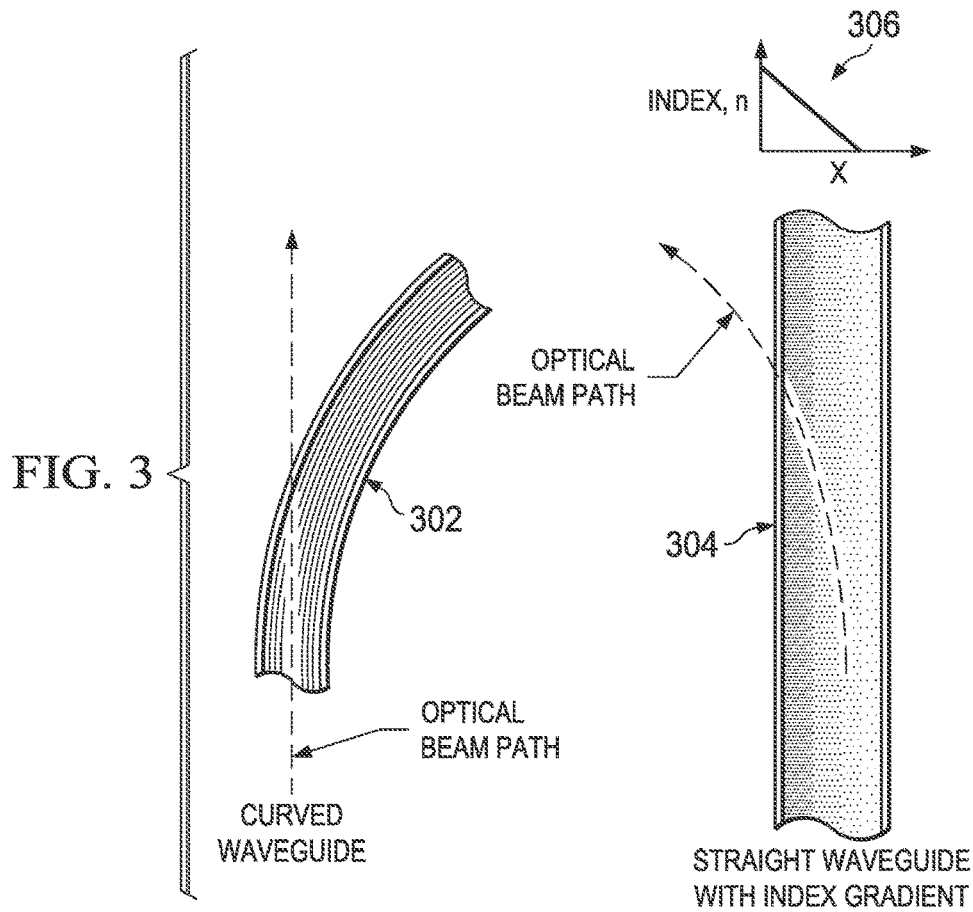
FIGS. 3 and 4 illustrate an example mechanism for creating optical leakage for higher-order modes from elongated end features into cladding of an optical fiber according to this disclosure.
Figure 4:
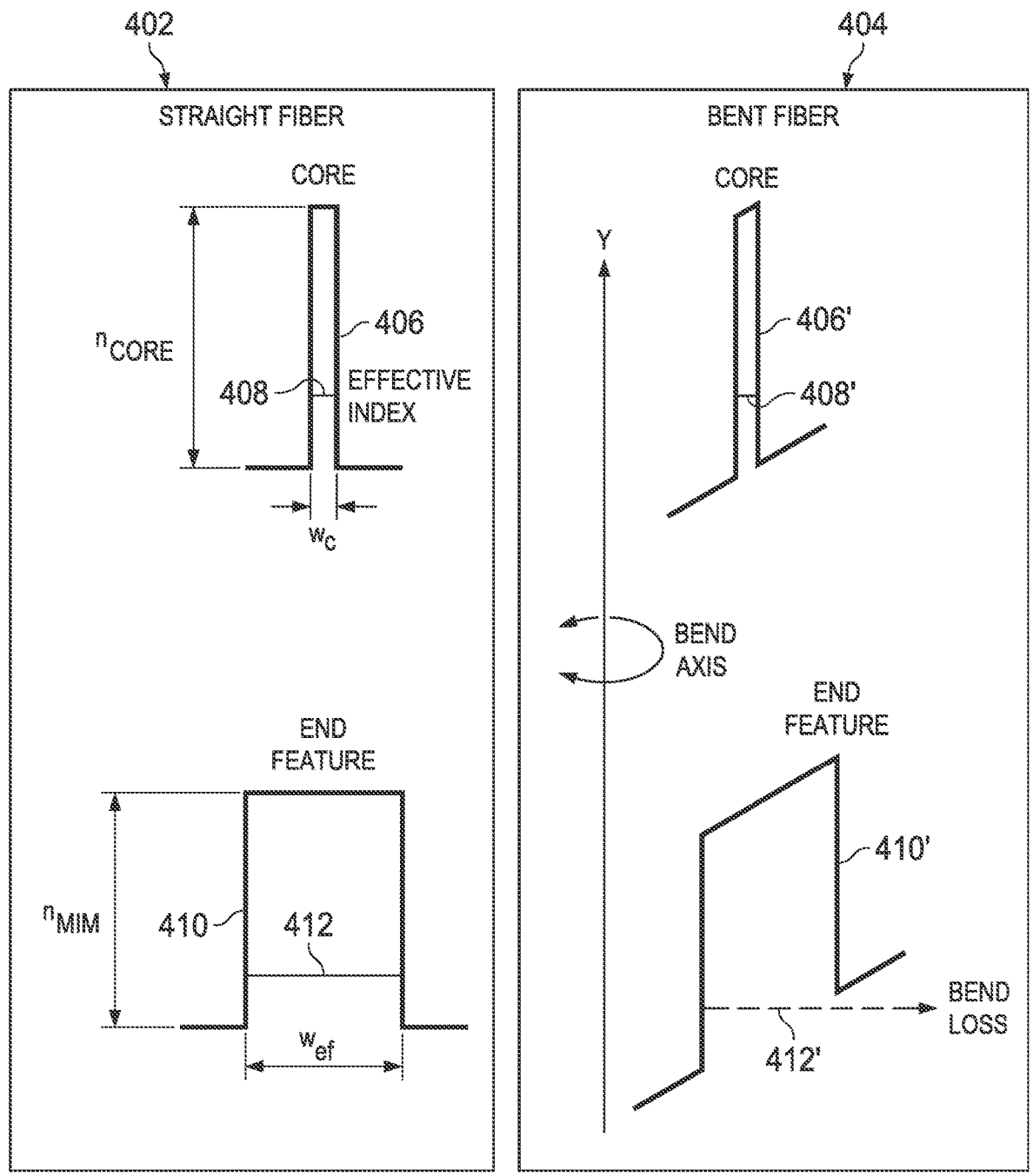

FIGS. 3 and 4 illustrate an example mechanism for creating optical leakage for higher-order modes from elongated end features into cladding of an optical fiber according to this disclosure. Note that while described with respect to the optical fiber 100 of FIG. 1, other optical fibers could be used, such as optical fibers having other core or end feature shapes or dimensions.

Once the parameters of the optical fiber's core 102 and end features 104a-104b are established (such as described above), the optical fiber 100 can be fabricated having those parameters. How the optical fiber 100 is then coiled or otherwise used can be managed to produce a controllable leakage path so that optical power within the end features 104a-104b can propagate out into the external cladding 106 of the fiber 100. Light accumulation in the end features 104a-104b is undesired, since such light can leak back into the core 102 where it can degrade the core mode quality. The presence of optical power within the end features 104a-104b is one consequence of the mode control achieved by exploiting the mutual resonances between the modes of the coupled waveguides (the core 102 and the end features 104a-104b) to draw the higher-order core modes out into the end features 104a-104b. Another source of optical power within the end features 104a-104b is spill-over of the coupled light at an input facet of the optical fiber 100. Ideally, this power is stripped out of the end features 104a-104b into the external cladding 106, regardless of its origin, while avoiding absorption or other heat-generating dissipation mechanisms that might accompany other approaches for eliminating the light in the end features 104a-104b.

In some embodiments, this can be achieved by bending the optical fiber 100 in the fast-axis direction 110. This is particularly attractive because the most desirable packaging for the optical fiber 100 is often as a compact coil produced by bending the fiber 100 in that direction. This approach therefore allows the same bending used for compact packaging to be exploited for the desired mode stripping by the end features 104a-104b. The bending described below can strip out light from the end features 104a-104b while maintaining lossless propagation for the fundamental core mode.

The impact of a bend on an optical beam propagating through a waveguide or fiber can be understood by referring to FIG. 3. On the left, if a bend 302 in an optical fiber had no impact on optical propagation, an optical beam would leak out of the fiber at the curved fiber boundary. However, this is the perspective of an observer outside of the waveguide. For present purposes, envision the situation from a perspective that is inside the waveguide. Detailed propagation studies show that a fiber bend produces an effective gradient of refractive index 304 (an index "wedge") in the plane of the bent fiber, where the higher index is located on the outside of the bend. More precisely, it has been shown that the bent fiber can be treated as a straight fiber with an additional linear index gradient in the transverse dimension. The effective index gradient is known to be proportional to the bending rate. A simple representation of this behavior is shown in a graph 306 in FIG. 3, which denotes a schematic representation of the index gradient. According to this model, an optical beam propagating in the waveguide will be deviated out of the core by the cumulative influence of the effective index gradient. From the perspectives of both the fiber and the optical beam, the optical beam propagations represented on both sides of FIG. 3 are equivalent.

The following explains how such a simple bend can accomplish the objective of increased propagation losses for the end features 104a-104b with little or no loss for the core 102. FIG. 4 schematically shows refractive index profiles 402 and 404 of the core 102 and end features 104a-104b for cuts across the fast-axis direction of straight and bent optical fibers, respectively. The profiles 402 on the left side of FIG. 4 show the situation with a straight fiber. The upper portion of the profiles 402 shows a cut 406 passing through the core 102. Within a narrow spatial interval specified by the thickness $w_c$ of the core 102, the core index is stepwise elevated higher than the cladding index by an amount $n_{core}$. The effective index level for the fundamental mode of the core 102 is shown as a line 408. In the lower portion of the profiles 402, a cut 410 passes through the end feature 104a or 104b, and the index is elevated to $n_{MIM}$ higher than the same cladding index within the extended width $w_{ef}$ of the end feature 104a or 104b. The effective index level for the fundamental mode of the end feature 104a or 104b is also indicated as a line 412. As indicated in the profiles 402, the spatial extent of the end features 104a-104b is greater than for the core 102 in the fast-axis direction 110 since $w_{ef} > w_c$.

The profiles 404 show fast-axis cuts 406' and 410' with corresponding lines 408' and 412' representing the effective index level for the fundamental mode of the core 102 and the effective index level for the fundamental mode of the end features 104a-104b, respectively, for a bent fiber. As discussed above, the mechanical bending of a waveguide generates an effective linear slope of the relative effective index, and the effect of this linear index gradient is evident in the profiles 404. The index gradient is along the direction of the local bend radius, from the location of the bend axis out, and the slope is proportional to the bending curvature. As was discussed above with reference to FIG. 3, the optical equivalence of the index slope to bend radius means that light propagates along a bent fiber the same way it would propagate along a straight fiber but with an added transverse refractive index gradient.

It is also known that bending a fiber can result in mode-dependent leakage of some modes from a waveguide. Higher-order modes are stripped out of the core 102 more easily, while the fundamental core mode is more bend-tolerant. This effect is used in fiber-laser practice for cleaning up a laser beam, meaning the fiber is bent at a radius that results in the stripping of the higher-order modes but still efficiently guiding the fundamental mode. The physics of bend-induced loss is visualized in FIG. 4. When the bend-induced linear gradient of refractive index is applied, it elevates the effective cladding index on the outer boundary of the bent waveguide while reducing it at the inner boundary. If the outer boundary's cladding index rises above the effective index of the mode (as shown for line 412'), total internal reflection is lost for this mode at that boundary, and the mode starts leaking through this boundary to the cladding 106. For the same coiling diameter (meaning for the same index gradient), larger waveguide sizes in the bending direction translate into larger index offset rises at the end of the end features 104a-104b. This designed-in leakage occurs for the end feature modes, where the index offset is large. It does not occur in the thin fast-axis core dimension, where the index offset is insufficient as discussed above.

Two other facts are also known. First, the effective index for higher-order modes would actually be lower than that of the fundamental mode (the lines 408-408', 412-412'), and this fact makes the higher-order modes even more sensitive to bends. A smaller slope (a larger bend radius) may be needed to reach the leakage condition for the wider end features 104a-104b than for the narrower core 102, so the higher-order modes will leak prior to the lower-order modes as the bend diameter is reduced. The fundamental mode of the core 102, having the highest effective index, is the most resistant to bends. This fact can be readily interpreted in terms of the logic represented in FIG. 4.

It is also known that modes in a larger-size core are more sensitive to bend loss compared to a smaller-size core of the same numerical aperture. Indeed, for the same bending rate (meaning the same index slope), the amplitude of elevation of cladding index values at an external boundary of a waveguide becomes larger for the larger core sizes. Consequently, the leak condition can be reached at a lower bending rate.

These characteristics regarding bend loss can be used in the design of the optical fiber 100. For example, in some embodiments, the end features' fast-axis dimension $w_{ef}$ can be selected in combination with the bend radius as follows. The bend radius is selected to be large enough so that the fundamental mode of the core 102 continues to be guided and, at the same time, to be small enough that the fundamental mode of the larger end feature dimension $w_{ef}$ experiences leakage loss. In this case, all end feature modes will be leaky since they are lower in effective index.

Although FIGS. 3 and 4 illustrate one example of a mechanism for creating optical leakage for higher-order modes from elongated end features into cladding of an optical fiber, various changes may be made to FIGS. 3 and 4. For example, the transverse refractive index gradient 304 in FIG. 3 and the effects of bending shown in FIG. 4 are for illustration only, and other index gradients and effective-index value shifts could be used in an optical fiber.

Figure 5:
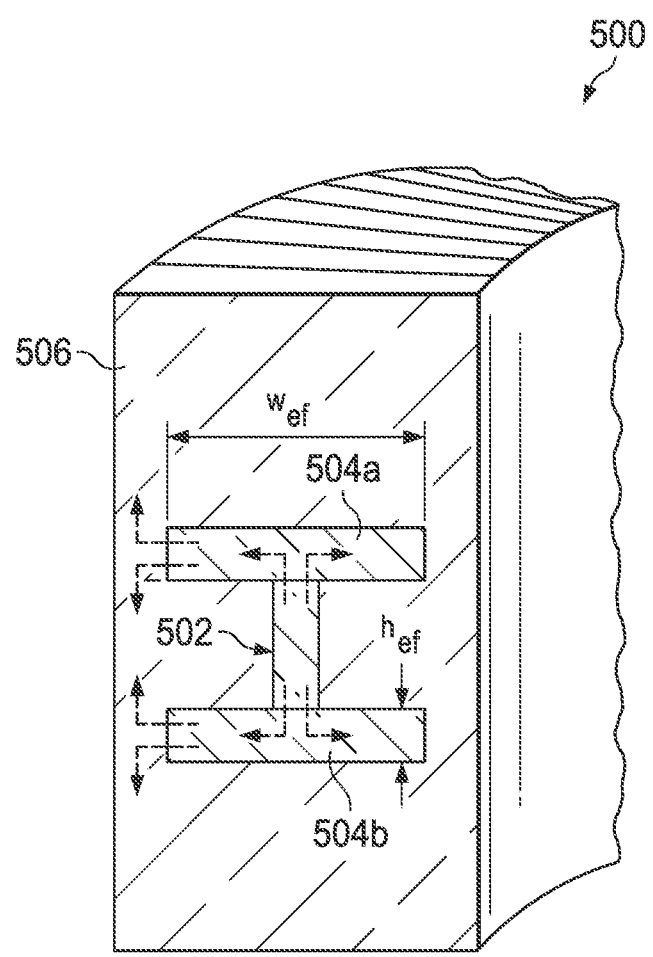
FIG. 5 illustrates a cross-section of a short, curved length of another example optical fiber having a core with lower bend loss and end features with higher bend loss according to this disclosure.

Note that while illustrated and described above as having a core with a high aspect ratio, the use of end features having a higher bend loss than a core in an optical fiber is not limited to use with high-aspect-ratio cores. FIG. 5 illustrates a cross-section of a short, curved length of another example optical fiber 500 having a core 502 with lower bend loss and end features 504a-504b with higher bend loss according to this disclosure. A cladding 506 surrounds the core 502 and the end features 504a-504b.

As can be seen in FIG. 5, the core 502 has a much smaller aspect ratio compared to the core 102. However, the end features 504a-504b can still allow optical power to leak from the end features 504a-504b into the cladding 506 away from the core 502 when the optical fiber 500 is bent. As a result, the end features 504a-504b can be used as described above to help resolve various issues that can occur in the optical fiber 500.

Although FIG. 5 illustrates one example of an optical fiber 500 having a core 502 with lower bend loss and end features 504a-504b with higher bend loss, various changes may be made to FIG. 5. For example, the core 502 and the end features 504a-504b could have any other suitable shape(s). As particular examples, each of the end features 504a-504b could have a different shape than rectangular, such as an ellipse, half-moon, or other shapes that enable stronger bend loss as compared to the bend loss in the core 502.

Figure 6:
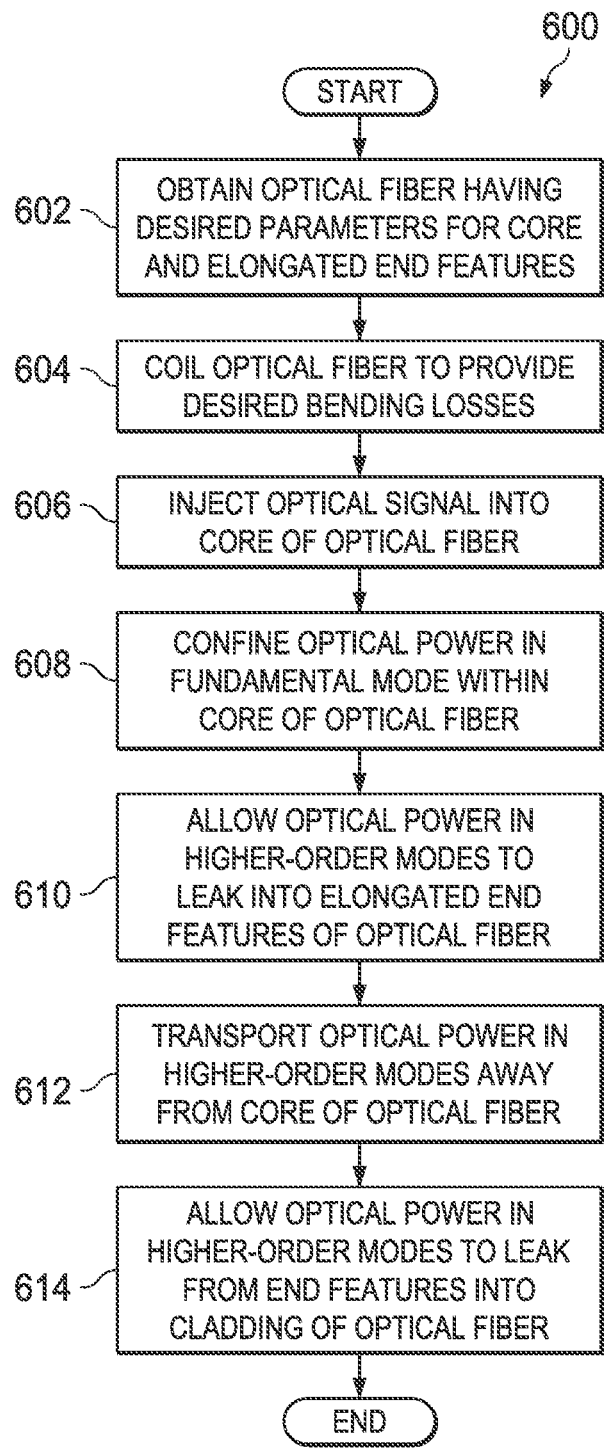
FIG. 6 illustrates an example method for using an optical fiber having a core with lower bend loss and end features with higher bend loss according to this disclosure.

FIG. 6 illustrates an example method 600 for using an optical fiber having a core with lower bend loss and end features with higher bend loss according to this disclosure. Note that while described with respect to the optical fiber 100 of FIG. 1, the method 600 could involve other optical fibers, such as the optical fiber 500 or optical fibers having other core or end feature shapes or dimensions.

As shown in FIG. 6, an optical fiber having desired parameters for its core and its elongated end features is obtained at step 602. This could include, for example, obtaining an optical fiber 100 having a desired index offset between the core 102 and the end features 104a-104b. The optical fiber 100 could also have desired dimensions for the end features 104a-104b. These parameters can be selected in order to eliminate propagation resonances between the core 102 and the end features 104a-104b for the core's fundamental mode as described above. These parameters can also be selected in order to facilitate easier leakage of higher-order modes into the end features 104a-104b as described above.

The optical fiber is coiled to provide desired bending losses in the optical fiber at step 604. This could include, for example, identifying the desired bending radius needed to allow leakage of higher-order modes from the wider end features 104a-104b without causing leakage of the fundamental mode of the core 102. This could also include coiling the optical fiber 100 using the identified bending radius.

An optical signal is injected into the core of the optical fiber at step 606. This could include, for example, a laser injecting a high-power or other optical beam into the core 102. Optical power in the fundamental mode of the core is confined to the core at step 608, while higher-order modes are allowed to leak from the core into the end features at step 610. This could include, for example, using resonances for the higher-order modes to transfer the optical power in the higher-order modes into the end features 104a-104b. Since propagation resonances between the core 102 and the end features 104a-104b for the core's fundamental mode are avoided, the fundamental mode remains confined in the core 102.

The optical power in the higher-order core modes is transported away from the core to the end features at step 612, and the optical power transported to the end features is allowed to leak into the cladding of the optical fiber at step 614. This could include, for example, the bending of the optical fiber 100 facilitating the leakage of the optical power from the end features 104a-104b into the cladding 106. Because the optical power is leaking from the end features 104a-104b into the cladding 106 away from the core 102, the optical power entering the cladding 106 may have little or no effect on the operation of the core 102.

Although FIG. 6 illustrates one example of a method 600 for using an optical fiber having a core with lower bend loss and end features with higher bend loss, various changes may be made to FIG. 6. For example, while shown as a series of steps, various steps in FIG. 6 could overlap, occur in parallel, occur in a different order, or occur multiple times. As a particular example, steps 606-614 could generally overlap during use of the optical fiber 100.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments (including embodiments with certain dimensions, aspect ratios, index values, and other parameters) and generally associated methods, it is important to recognize that alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an optical fiber configured to transport an optical signal, a cross-section of the optical fiber having a longer slow-axis dimension and a shorter fast-axis dimension, the optical fiber comprising:
a core configured to receive and amplify the optical signal, the core having a height in the slow-axis dimension and a width in the fast-axis dimension;
end features optically coupled to the core at opposite ends of the core, each end feature having a height in the slow-axis dimension and a width in the fast-axis dimension, the core having a lower bend loss than the end features; and
a cladding surrounding the core and the end features;
wherein the optical fiber is configured when bent to confine optical power of a fundamental mode in the core and to allow optical power of one or more higher-order modes to leak from the core into the end features;
wherein the height of each end feature in the slow-axis dimension is less than the width of the core in the fast-axis dimension; and
wherein a bend radius of the optical fiber is selected to strip the optical power in the end features while allowing the optical fiber to guide the optical power of the fundamental mode in the core.

2. The apparatus of claim 1, wherein a refractive index offset between at least one material in the core and at least one material in the end features is selected to prevent a direct resonance between the fundamental mode in the core and any mode in one or more of the end features.

3. The apparatus of claim 1, wherein an effective index of a fundamental mode in the end features is below an effective index of the fundamental mode in the core.

4. The apparatus of claim 1, wherein:
the core is rectangular; and
each of the end features is rectangular or elliptical.

5. The apparatus of claim 1, wherein the width of each end feature in the fast-axis dimension is substantially smaller than the height of the core in the slow-axis dimension.

6. The apparatus of claim 5, wherein an aspect ratio of the core is at least 10:1.

7. The apparatus of claim 1, wherein:
the core comprises at least one material and is doped with active lasing ions; and
each of the end features comprises the at least one material and is not doped with any active lasing ions, each of the end features contacting the core.

8. A method comprising:
injecting an optical signal into an optical fiber, a cross-section of the optical fiber having a longer slow-axis dimension and a shorter fast-axis dimension;
confining optical power of a fundamental mode in a core of the optical fiber, the core configured to receive and amplify the optical signal, the core having a height in the slow-axis dimension and a width in the fast-axis dimension; and
allowing optical power of one or more higher-order modes to leak from the core into end features due to bending of the optical fiber the end features optically coupled to the core at opposite ends of the core, each end feature having a height in the slow-axis dimension and a width in the fast-axis dimension, the core having a lower bend loss than the end features;
wherein the height of each end feature in the slow-axis dimension is less than the width of the core in the fast-axis dimension; and
wherein a bend radius of the optical fiber is selected to strip the optical power in the end features while allowing the optical fiber to guide the optical power of the fundamental mode in the core.

9. The method of claim 8, further comprising:
selecting a refractive index offset between at least one material in the core and at least one material in the end features to prevent a direct resonance between the fundamental mode in the core and any mode in one or more of the end features.

10. The method of claim 8, wherein an effective index of a fundamental mode in the end features is below an effective index of the fundamental mode in the core.

11. The method of claim 8, wherein:
the core is rectangular; and
each of the end features is rectangular or elliptical.

12. The method of claim 8, wherein the width of each end feature in the fast-axis dimension is substantially smaller than the height of the core in the slow-axis dimension.

13. The method of claim 8, wherein:
the core comprises at least one material and is doped with active lasing ions; and
each of the end features comprises the at least one material and is not doped with any active lasing ions, each of the end features contacting the core.

14. A method comprising:
obtaining an optical fiber, a cross-section of the optical fiber having a longer slow-axis dimension and a shorter fast-axis dimension, the optical fiber comprising:
a core configured to receive and amplify an optical signal, the core having a height in the slow-axis dimension and a width in the fast-axis dimension;
end features optically coupled to the core at opposite ends of the core, each end feature having a height in the slow-axis dimension and a width in the fast-axis dimension, the core having a lower bend loss than the end features; and
a cladding surrounding the core and the end features;
selecting a bend radius of the optical fiber in order to strip optical power, including optical power of one or more higher-order modes, from the end features while allowing the optical fiber to guide optical power of a fundamental mode in the core; and
bending the optical fiber to allow the optical power in the end features to leak from the end features into the cladding;
wherein the height of each end feature in the slow-axis dimension is less than the width of the core in the fast-axis dimension.

15. The method of claim 14, wherein a refractive index offset between at least one material in the core and at least one material in the end features is selected to prevent a direct resonance between the fundamental mode in the core and any mode in one or more of the end features.

16. The method of claim 14, wherein an effective index of a fundamental mode in the end features is below an effective index of the fundamental mode in the core.

17. The method of claim 14, wherein:
the core is rectangular; and
each of the end features is rectangular or elliptical.

18. The method of claim 14, wherein the width of each end feature in the fast-axis dimension is substantially smaller than the height of the core in the slow-axis dimension.

19. The method of claim 14, wherein the width of each end feature in the fast-axis dimension is similar to the height of the core in the slow-axis dimension.

20. The method of claim 14, wherein:
the core comprises at least one material and is doped with active lasing ions; and
each of the end features comprises the at least one material and is not doped with any active lasing ions, each of the end features contacting the core.

* * * * *